United States Patent
Trice et al.

(10) Patent No.: US 8,030,591 B2
(45) Date of Patent: Oct. 4, 2011

(54) MICROREPLICATION ON A COMPLEX SURFACE

(75) Inventors: Jennifer L. Trice, Hugo, MN (US); Charles N. Devore, Hugo, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 859 days.

(21) Appl. No.: 11/461,156

(22) Filed: Jul. 31, 2006

(65) Prior Publication Data

US 2008/0023446 A1    Jan. 31, 2008

(51) Int. Cl.
*B23H 1/04* (2006.01)
*B23H 7/30* (2006.01)

(52) U.S. Cl. .............. 219/69.15; 219/69.17; 219/69.2

(58) Field of Classification Search .......... 219/69.15, 219/69.17, 69.2
See application file for complete search history.

(56) References Cited

U.S. PATENT DOCUMENTS

| | | | |
|---|---|---|---|
| 3,498,158 A * | 3/1970 | Kougel | 219/69.17 |
| 3,655,936 A * | 4/1972 | Saito et al. | 219/69.13 |
| 3,806,691 A * | 4/1974 | Roach | 219/69.15 |
| 4,159,407 A * | 6/1979 | Wilkinson et al. | 219/69.17 |
| 4,471,200 A | 9/1984 | Takahashi et al. | |
| 4,683,364 A * | 7/1987 | Anderson | 219/69.1 |
| 4,735,678 A * | 4/1988 | Mandigo et al. | 219/69.17 |
| 4,739,235 A * | 4/1988 | Aikawa et al. | 219/121.28 |
| 4,892,989 A * | 1/1990 | Itoh | 219/69.14 |
| 4,923,772 A | 5/1990 | Kirch et al. | |
| 5,155,623 A | 10/1992 | Miller et al. | |
| 5,227,602 A * | 7/1993 | Kuhn | 219/69.17 |
| 5,286,944 A | 2/1994 | Li | |
| 5,453,592 A * | 9/1995 | Takeuchi et al. | 219/69.17 |
| 5,538,674 A | 7/1996 | Nisper et al. | |
| 5,922,222 A | 7/1999 | Jens et al. | |
| 5,972,209 A * | 10/1999 | Shih | 210/85 |
| 6,231,309 B1 * | 5/2001 | Popoola et al. | 416/244 R |
| 6,417,480 B2 * | 7/2002 | Goto et al. | 219/121.27 |
| 6,531,036 B1 * | 3/2003 | Leitgeb et al. | 204/164 |
| 6,538,227 B1 * | 3/2003 | Sano et al. | 219/69.2 |
| 6,586,699 B1 * | 7/2003 | Gianchandani et al. | 219/69.15 |
| 6,624,377 B2 | 9/2003 | Gianchandani et al. | |
| 6,661,962 B1 | 12/2003 | Calvet et al. | |
| 6,717,094 B2 * | 4/2004 | Beaumont | 219/69.14 |
| 2002/0179573 A1 * | 12/2002 | Gianchandani et al. | 219/69.11 |
| 2003/0042229 A1 | 3/2003 | Marcher | |

(Continued)

FOREIGN PATENT DOCUMENTS

DE    2553385 A * 6/1977

(Continued)

OTHER PUBLICATIONS

Machine translation of Japan Patent document No. 2005-66,760, Jun. 5, 2009.*

(Continued)

*Primary Examiner* — Geoffrey S Evans

(57) ABSTRACT

A cutting tool assembly using a machined tool operating in a plunge mode of electrical discharge machining to make microreplicated features in a work piece having a complex surface. The microreplicated features can be non-adjacent and can have any geometric configuration and micron-scaled dimensions, as determined by the microstructured features in the tool. The machined work piece can be used as a master tool in order to make microreplicated articles such as optical films, friction control films, plasma display panel molds, or micro-fasteners.

20 Claims, 5 Drawing Sheets

U.S. PATENT DOCUMENTS

2005/0269742 A1 12/2005 Wright et al.
2008/0257867 A1* 10/2008 Malshe et al. ............. 219/69.14

FOREIGN PATENT DOCUMENTS

| DE | 19524221 A1 | * | 1/1997 |
| JP | SHO 55-65032 | | 5/1980 |
| JP | 2-88117 A | * | 3/1990 |
| JP | 3-256620 A | * | 11/1991 |
| JP | 5-261622 A | * | 10/1993 |
| JP | 7-299667 A | * | 11/1995 |
| JP | 9-16238 A | * | 1/1997 |
| JP | 2000-263334 A | * | 9/2000 |
| JP | 2002-1617 A | * | 2/2002 |
| JP | 2003-205439 A | * | 7/2003 |
| JP | 2005-66760 | | 3/2005 |
| JP | 2005-66760 A | * | 3/2005 |
| JP | 2005-329498 A | * | 12/2005 |
| KR | 20010076680 | | 8/2001 |
| KR | 20050042661 | | 5/2005 |
| SU | 423100 | | 4/1974 |
| SU | 423100 A | * | 9/1974 |
| WO | WO-9736708 A | * | 10/1997 |

OTHER PUBLICATIONS

Machine translation of DE 19524221, Jan. 2011.*

Descoeudres et al., "Optical emission spectroscopy of electrical discharge machining plasma," *Journal of Physics D: Applied Physics*, 37, 2004, pp. 875-882.

Choi et al, "Whole device printing for full colour displays with organic light emitting diodes," *Nanotechnology*, 17, 2006, pp. 2246-2249.

Yahya et al., "Determination of material removal rate of an electro-discharge machine using dimensional analysis," *Journal of Physics D: Applied Physics*, 37, 2004, pp. 1467-1471.

* cited by examiner

MICROREPLICATION ON A COMPLEX SURFACE

BACKGROUND

Machining techniques, such as diamond turning and plunge electrical discharge machining, can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

The microstructured features can also be made by various other methods. For example, the structure of the master tool can be transferred on other media, such as to a belt or web of polymeric material, by a cast and cure process from the master tool to form a production tool; this production tool is then used to make the microreplicated structure. Other methods such as electroforming can be used to copy the master tool. Other techniques include chemical etching, bead blasting, or other stochastic surface modification techniques.

SUMMARY

A cutting tool assembly, consistent with the present invention, includes an electrical discharge machining (EDM) unit configured for plunge EDM operation, a tool having a surface with microstructured features, and a work piece having a complex surface positioned adjacent the surface of the tool with microstructured features. The tool is operably coupled to the EDM unit, and the work piece is configured to be machined by the tool in the plunge EDM operation.

A method for cutting a work piece, consistent with the present invention, includes the steps of providing an EDM unit configured for plunge EDM operation, operably coupling to the EDM unit a tool having a surface with microstructured features, and positioning a work piece having a complex surface adjacent the surface of the tool with microstructured features. The work piece is configured to be machined by the tool in the plunge EDM operation.

In certain embodiments, the assembly and method can be used to make many non-adjacent microstructured features simultaneously, forming a microreplicated pattern, in a metallic complex work piece. The work piece can be used as a master tool to make other articles or films having substantially the same, although essentially inverted, microreplicated pattern. Such films can include, for example, optical films having non-adjacent lenslets or other microstructured optical films. Such articles can include, for example, substrates for plasma display panels, thermal heat sinks for LEDs, molds to make the heat sinks, or other articles having microstructured three-dimensional features.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments described in the present specification include methods of creating a three-dimensional surface with microstructured features. A plunge electrical discharge machining (EDM) unit can be used to apply micron-scale structures (referred to as "microstructured features") in order to machine a three-dimensional surface on a substrate or work piece. The resulting tool can be used for molding microreplicated three-dimensional parts and can be used as a master tool for making microreplicated surfaces. Utilization of EDM techniques allows for microstructured features to be applied to a complex surface. Plunge EDM is also referred to as sinker EDM and provides a way to make many microstructured features in a work piece in a single EDM operation. Due to the capabilities of plunge EDM, the work piece can be implemented with steel, for example. A steel work piece is more durable than other materials such as copper.

EDM is known in the art as described in, for example, the following references, both of which are incorporated herein by reference as if fully set forth: A. Descoeudres et al., "*Optical Emission Spectroscopy of Electrical Discharge Machining Plasma,*" Journal of Physics D: Applied Physics, vol. 37, pp. 875-882 (2004); and A Yahya et al., "*Determination of Material Removal Rate of an Electro-Discharge Machine Using Dimensional Analysis,*" Journal of Physics D: Applied Physics, vol. 37, pp. 1467-1471 (2004).

EDM System

Figure 1:
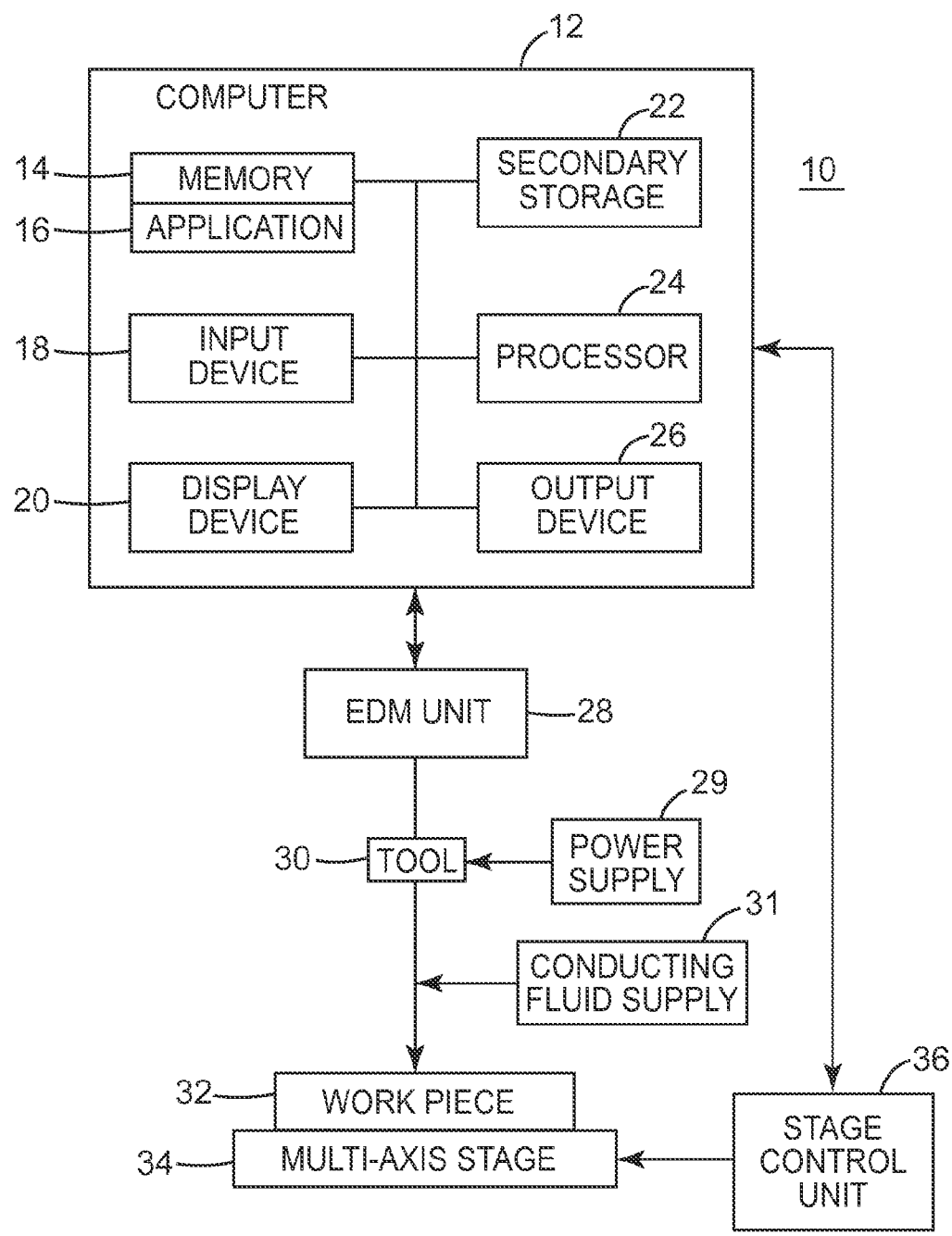
FIG. 1 is a diagram of a system for making microstructured features in a work piece using plunge EDM techniques.

FIG. 1 is a diagram of a system 10 for making microstructured features in a work piece using plunge EDM techniques. Microstructured features can include any type, number, shape, and dimension of micro-structures on or indenting into the surface of an article. System 10 is controlled by a computer 12. Computer 12 has, for example, the following components: a memory 14 storing one or more applications 16; a secondary storage 22 providing for non-volatile storage of information; an input device 18 for receiving information or commands; a processor 24 for executing applications stored in memory 16 or secondary storage 22, or received from another source; a display device 20 for outputting a visual display of information; and an output device 26 for outputting information in other forms such as speakers for audio information or a printer for a hardcopy of information.

The cutting of a work piece 32 on a multi-axis stage 34 is performed by a tool 30 controlled by an EDM unit 28. A power supply 29 provides power to tool 30, while a conducting fluid supply 31 provides a conducting fluid between tool 30 and work piece 32 for plunge EDM operations. In operation, computer 12, via a stage control unit 36, controls movement of multi-axis stage 34 and work piece 32 as tool 30 makes microstructured features in the work piece. Computer 12, via EDM unit 28, can also control tool 30 in a plunge EDM operation as multi-axis stage 34 moves work piece 32 beneath it.

Multi-axis stages are known in the art and include any device having multiple axes for moving a work piece in multiple translational directions with respect to a tool, in multiple rotational directions with respect to the tool, or in both multiple translational directions and multiple rotational directions with respect to the tool. A six-axis stage is possible for providing movement of a work piece in three translational directions and three rotational directions with respect to a tool. Five-axis stages are more commonly used, and five-axis stages provide for movement of a work piece in three translational directions and two rotational directions with respect to a tool. Examples of multi-axis stages, including five-axis stages, are currently commercially available from the following companies: ONA America, Inc. (US); Agie Charmilles (UK); Sodie (FR); and Mitsubishi (JP).

The machining can involve moving the work piece via the stage, moving the tool, or moving both. It can also involve multiple passes of the tool, using possibly overlapping passes and different tools. This control for machining using EDM can be accomplished using, for example, numerical control techniques or a numerical controller (NC) implemented in software, firmware, or a combination in computer 12. In particular, computer 12 can control movement of tool 30 via EDM unit 28 and movement of work piece 32 via stage control unit 36. EDM unit 28, by receiving signals from computer 12, can control the activation of tool 30 to erode portions of work piece 32 to form microstructured features in it. This activation can include, for example, operating tool 30 in a plunge EDM mode, known in the art. EDM unit 28 can be implemented with any device capable of electrical (or electro) discharge machining, in a plunge EDM operation, and possibly capable of moving the corresponding tool across the surface of a work piece.

Work piece 32 can be implemented with any electrically conductive material capable of being electrical discharge machined. Examples include aluminum, nickel, copper, brass, steel, graphite, tungsten carbide or alloys or mixtures of these materials. The particular material to be used may depend, for example, upon a particular desired application such as various films made using the machined work piece.

Work piece 32, after having been machined, can be used to make films having the corresponding microstructured features for use in a variety of applications. Examples of those films include optical films, friction control films, molds for making a plasma display panel, molds for injection molding and micro-fasteners or other microstructured components. The films are typically made using a coating process in which a material in a viscous state is applied to the work piece, allowed to at least partially cure, and then removed. The film composed of the cured material will have substantially the opposite structures than those in the work piece. For example, an indentation (negative feature) in the work piece results in a protrusion (positive feature) in the resulting film.

Microreplication Using Plunge EDM

Figure 2A:
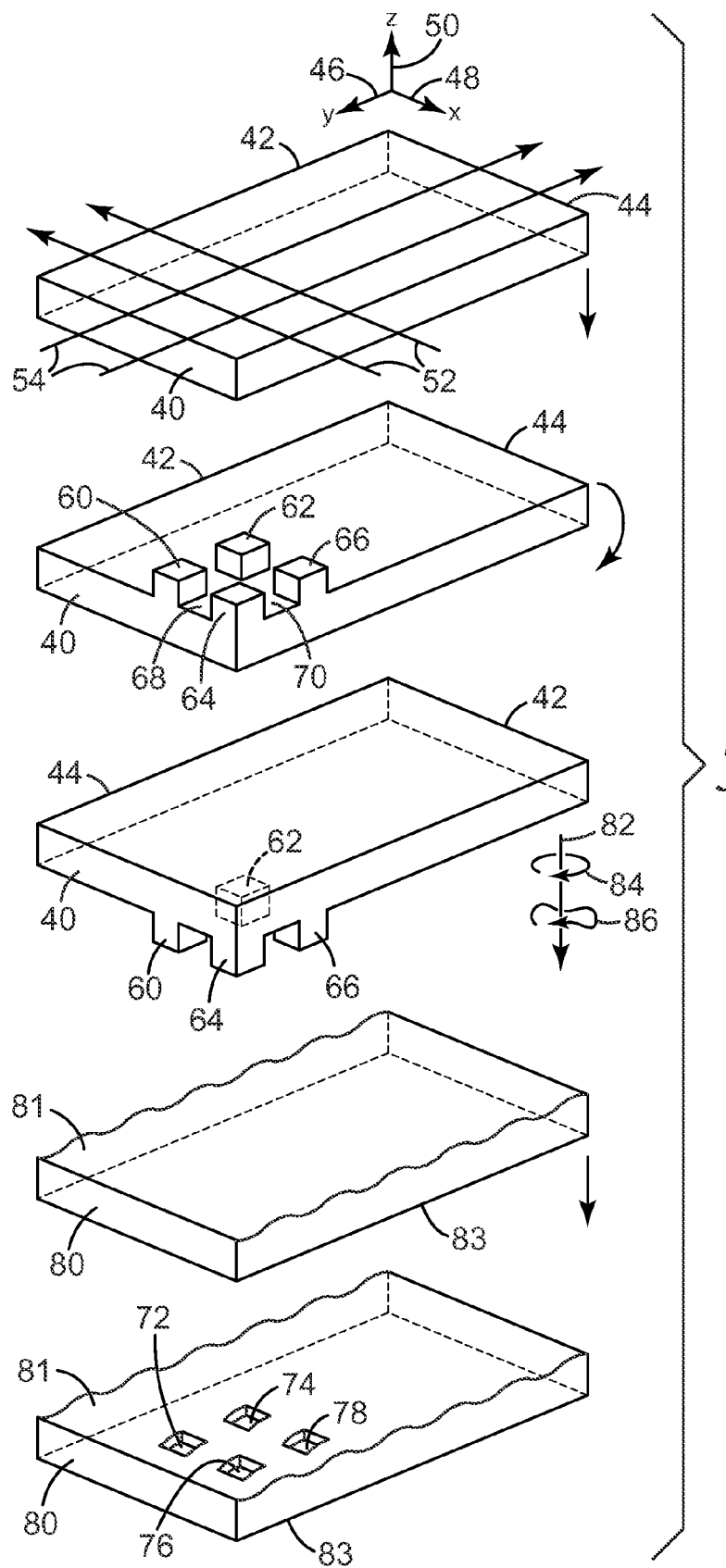
FIG. 2A is a diagram illustrating making a machined tool and using that tool for microreplication on a complex work piece using plunge EDM techniques.

FIG. 2A is a diagram illustrating making a machined tool 40 and using that tool for microreplication on a complex surface of a work piece 80 using plunge EDM techniques. Machined tool 40 corresponds with tool 30, and work piece 80 corresponds with work piece 32. Work piece 80 can be machined using the EDM system shown in FIG. 1. The term "complex surface" refers to a non-flat (non-planar) surface or at least a portion of it. The term "complex work piece" refers to a work piece having a complex surface capable of being machined.

The coordinate system, in this exemplary embodiment, includes an x-direction 48, a y-direction 46, and a z-direction 50. The z-direction 50 refers to movement in a direction substantially perpendicular to tool 40 or work piece 80. The x-direction and y-direction are substantially perpendicular to the z-direction, and the x-direction 48 and the y-direction 46 refer to movement in mutually orthogonal directions substantially parallel with a surface of tool 40 or work piece 80. For example, the x-direction and y-direction refer to movement along sides 44 and 42, respectively, of tool 40, and the z-direction refers to movement into or out of, and substantially perpendicular to, a surface of tool 40. When machining a work piece, multi-axis stage 34 can move the work piece in the directions corresponding with x-direction 48 and y-direction 46. As an alternative to a work piece in planar form, as shown in FIG. 2, the work piece can be implemented with a roll or a material in other non-planar forms.

Prior to machining, tool 40 is typically implemented with a piece of blank electrically conductive material, such as aluminum, nickel, copper, brass, graphite, tungsten carbide or steel and alloys of these materials. That material for tool 40 is machined in order to make a machined tool for plunge EDM. Using wire EDM techniques, for example, multiple passes are made across tool 40 as represented by lines 52 and 54. The wire EDM causes machining away of the metallic material from tool 40 to create microstructured protrusions as represented by microstructured features 60, 62, 64, and 66. Area 68 represents one of the areas machined away by one of the passes 54, and area 70 represents one of the areas machined away by one of the passes 52. Only four wire EDM passes (52, 54) and four microstructured features (60, 62, 64, 66) are shown for illustrative purposes only; typically, many passes of a wire electrode in EDM are made for creating machined tool 40. Also, the passes 52 and 54 are shown as linear passes for illustrative purposes only; wire EDM can also be used to make non-linear passes in order to make microstructured features with curved or non-linear sides, in the x- and y-directions, on tool 40.

In addition, tool 40 can be fabricated in other ways to create a machined tool have microstructured features, for example by using diamond turning machining, flycutting, or milling, grinding, photolithography, etching or casting. Combinations of these fabrication techniques may also be used. As a result of the machining, tool 40 can have many microstructured features for machining a work piece. For example, tool 40 can have 10 microstructured features, 100 microstructured features, 500 microstructured features, or more preferably 1000 or more microstructured features (for example, made using 100 wire EDM passes in each of two mutually orthogonal directions on tool 40). Other numbers of microstructured features on tool 40 are also possible.

Once machined tool 40 has been created, it is essentially inverted for use as tool 30 under control of EDM unit 28 and computer 12. Inverting the tool means that the microstructured features on it face toward a work piece to be machined, for example microstructured features 60, 62, 64, and 66 facing toward a top complex surface 81 of work piece 80. A bottom surface 83 of work piece 80 is placed on multi-axis stage 34 for movement of work piece 80 in the x- and y-directions. In this particular embodiment, the tool essentially includes an array of square or rectangular pins as the microstructured features.

Tool 40 is then used in a plunge EDM operation to machine work piece 80. As represented by arrow 82, and in the system of FIG. 1, the microstructured features of tool 40 are "plunged" against and into surface 81 of work piece 80 in order to machine away material to make microstructured features in work piece 80. Upon completion of machining, work piece 80 has negative microstructured features on a complex surface and corresponding substantially with the microstructured features on tool 40. For example, work piece 80 has microstructured (indented) features 72, 74, 76, and 78 corresponding substantially with microstructured features 60, 62, 64, and 66, respectively. As shown, the microstructured features 72, 74, 76, and 78 are non-adjacent, meaning that substantially non-machined areas separate them. The microstructured features can have a pitch of varying dimensions, the pitch referring to the distance between adjacent microstructured features.

In addition, during the plunge EDM operation, tool 40 under control of EDM unit 28 can orbit, meaning that tool 40 is moved in the x-direction, y-direction, or both, to further machine away material and make various configurations of microstructured features in work piece 80. For example, tool 40 can orbit in a regular pattern, as represented by movement along a path 84, or in an irregular pattern, as represented by movement along a path 86. In these cases, the microstructured features in the work piece will have a shape substantially corresponding with both a shape, and a movement during orbiting, of the microstructured features on the tool.

The microstructured features of tool 40 can be repeatedly plunged against and into surface 81 of work piece 80 in different locations to make many microstructured features in work piece 80. For example, the plunge EDM operation can be repeated a sufficient number of times to create between 1000 and six million microstructured features in the work piece. When the work piece is a substrate for a plasma display panel, for example, the plunge EDM operation of the tool can be used to create millions of non-adjacent microstructured features in the substrate, and each of those microstructured features creates a "pocket" to contain the plasma material for the pixels of the plasma display panel.

Figure 2B:
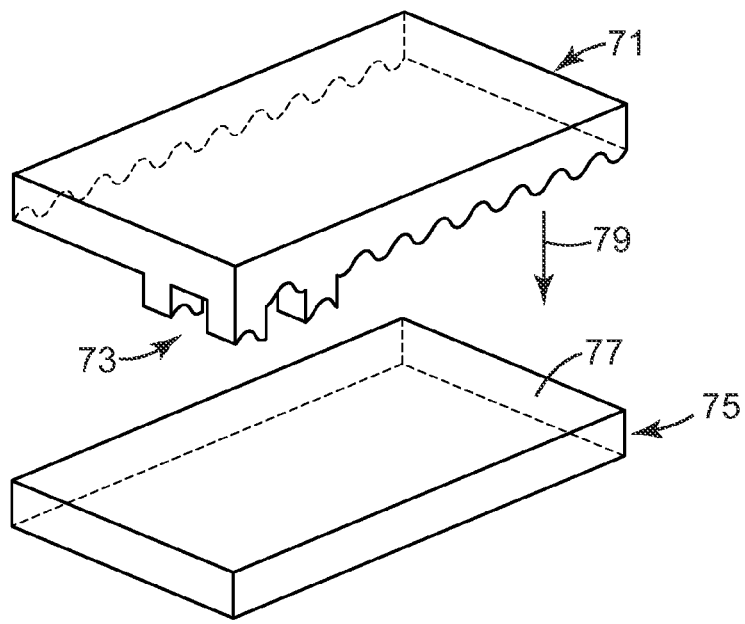
FIG. 2B is a diagram illustrating microreplication using plunge EDM techniques with a complex tool on a non-complex work piece.
Figure 2C:
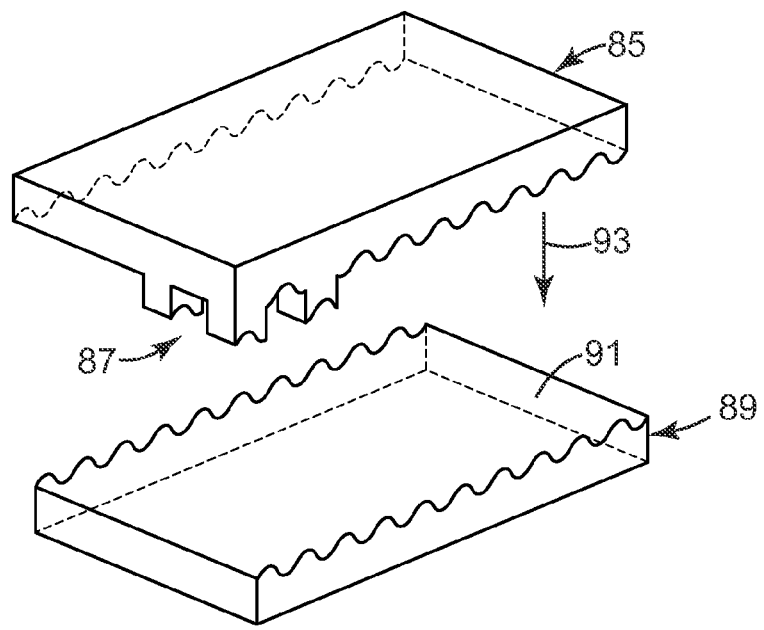
FIG. 2C is a diagram illustrating microreplication using plunge EDM techniques with a complex tool on a complex work piece.

As an alternative to the plunge EDM shown in FIG. 2A, plunge EDM can be used with a complex tool. The term "complex tool" refers to a tool having machined microstructures with complex surfaces. FIG. 2B is a diagram illustrating microreplication using plunge EDM techniques, represented by arrow 79, with a complex tool 71 having complex surface microstructures 73 on a non-complex work piece 75 having a non-complex surface 77. FIG. 2C is a diagram illustrating microreplication using plunge EDM techniques, represented by arrow 93, with a complex tool 85 having complex surface microstructures 87 on a complex work piece 89 having a complex surface 91. After use of the complex tool, one or more subsequent tools of slightly different geometry than the first tool can optionally be used to create a feature shape.

Figure 3A:
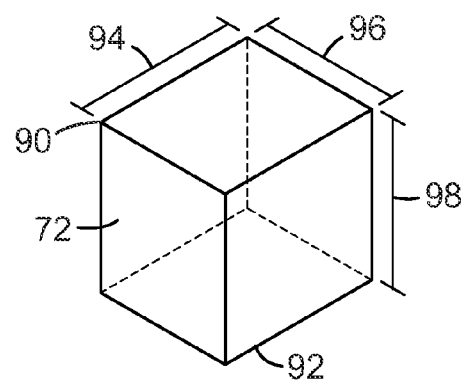
FIG. 3A is a diagram illustrating the shape of an exemplary microstructure made using a machined tool and plunge EDM techniques.
Figure 3B:
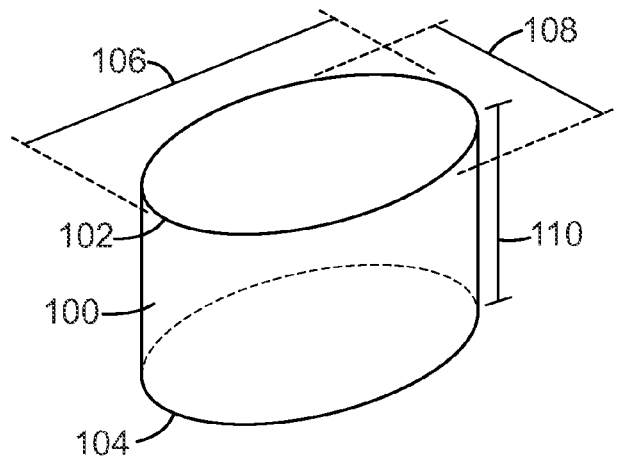
FIG. 3B is a diagram illustrating the shape of an exemplary microstructure made using a machined tool and plunge EDM techniques with a regular orbiting of the tool.
Figure 3C:
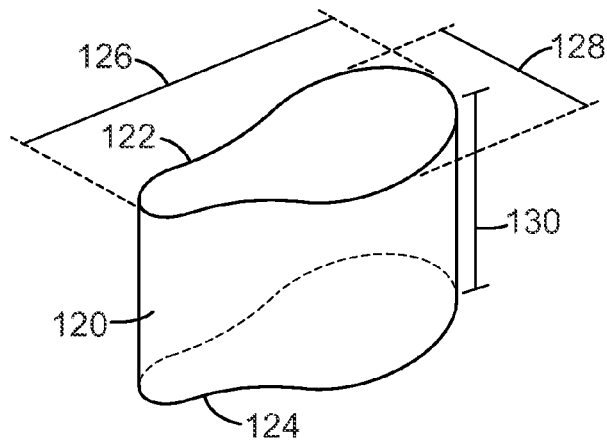
FIG. 3C is a diagram illustrating the shape of an exemplary microstructure made using a machined tool and plunge EDM techniques with an irregular orbiting of the tool.

FIGS. 3A-3C are diagrams representing exemplary individual microstructured features that can be made in a work piece using plunge EDM as described above. FIG. 3A is a diagram illustrating the shape of a microstructure 72 substantially corresponding with one of the microstructured features 60, 62, 64, or 66, and having a length 94, width 96, and depth 98. Microstructure 72 has a top 90 corresponding with a top surface 81 of work piece 80 and a bottom 92 located between top surface 81 and bottom surface 83.

FIG. 3B is a diagram illustrating the shape of a microstructure 100 substantially corresponding with one of the microstructured features 60, 62, 64, or 66, along with regular orbiting of the tool, and having an effective length 106, effective width 108, and depth 110. Microstructure 100 has a top 102 corresponding with a top surface 81 of work piece 80 and a bottom 104 located between top surface 81 and bottom surface 83.

FIG. 3C is a diagram illustrating the shape of a microstructure 120 substantially corresponding with one of the microstructured features 60, 62, 64, or 66, along with irregular orbiting of the tool, and having an effective length 126, effective width 128, and depth 130. As an alternative to orbiting of the tool, this shape and other shapes can be created by etching, photolithography, or other techniques to directly create the desired feature shape. Microstructure 120 has a top 122 corresponding with a top surface 81 of work piece 80 and a bottom 102 located between top surface 81 and bottom surface 83. Round microstructured features, such as feature 100 shown in FIG. 3B, can be used to make microreplicated circular wells, which is useful for medical applications, for example. Microstructures 72, 100, and 120 can have complex surfaces, depending upon a complex surface of a work piece in which they are machined. The work piece can be 5 millimeters (mm)×5 mm up to 2 meters by 2 meters, and any size between those two dimensions.

The microstructure features in the tool and work piece machined with it can have variable length, width, and depth of any particular dimension each. Microstructured features made using the system described above can each have a length, width, and depth, and together they can have a pitch, having any micron-scaled value such as, for example, one of the following values: 1000 microns, 100 microns, or 1 micron. Surface roughness (RA) or structure can also be provided by EDM in a sub-optical range around 200 nanometers (nm). Each of the length, width, depth, and pitch can be of the same or different micron-scaled values. Alternatively, in other embodiments, the length, width, depth, and pitch for the microstructured features can be greater than 1000 microns or any dimension extending substantially the entire length or width of the work piece. These dimensions are provided for illustrative purposes only, and microstructured features made using the system described above can have any dimension within the range capable of being tooled using the system. Furthermore, as illustrated in FIGS. 3A-3C, the microstructured features machined in the work piece can have sides that are substantially perpendicular with a top surface of the work piece, which is typically not possible with other machining techniques. The sides can alternatively be angled, depending upon the original shape of the microstructured features on the tool used to plunge EDM the work piece.

Figure 4:
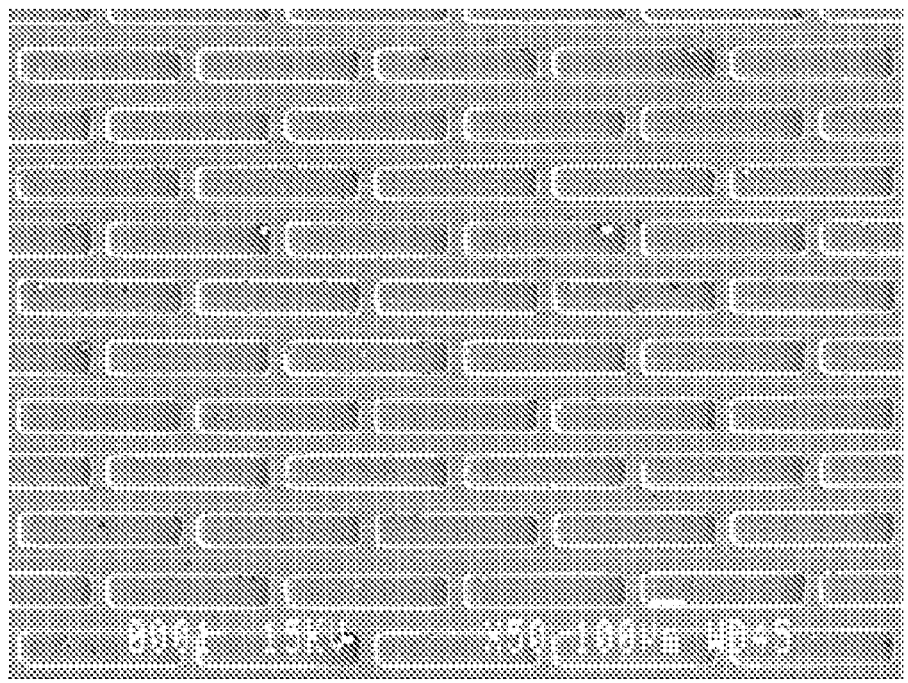
FIG. 4 is an image of exemplary microstructured features made using EDM techniques.

These multiple microstructured features can form a microreplicated pattern, meaning a regular or irregular repeating configuration of microstructured features in a work piece. In the microreplicated pattern, the microstructured features can be adjacent, discontinuous (non-adjacent), or a combination of them. Non-adjacent microstructured features are separated by a particular spacing, an example of which is shown in FIG. 4. The microreplicated features shown in FIG. 4 are sometimes referred to as a "brick" pattern.

While the present invention has been described in connection with an exemplary embodiment, it will be understood that many modifications will be readily apparent to those skilled in the art, and this application is intended to cover any adaptations or variations thereof. For example, various types of tools and machining using them may be used without departing from the scope of the invention. This invention should be limited only by the claims and equivalents thereof.

What is claimed is:

1. A cutting tool assembly, comprising:
   an electrical discharge machining (EDM) unit configured for plunge EDM operation; and
   a tool having patterned non-adjacent machined microstructured features with complex surfaces, the tool being operably coupled to the EDM unit; and
   wherein the assembly is capable of machining a work piece having a complex surface configured to be inverse to the surface of the tool and positioned adjacent the surface of the tool with the microstructured features, the work piece being configured to be machined by the tool in the plunge EDM operation to simultaneously form multiple patterned non-adjacent microstructured features with complex surfaces on the work piece.

2. The cutting tool assembly of claim 1, wherein the tool, under control of the EDM unit, makes a microreplicated pattern in the work piece.

3. The cutting tool assembly of claim 1, wherein the work piece is composed of one of the following materials: aluminum, nickel, copper, brass, steel, tungsten carbide, graphite or their alloys.

4. The cutting tool assembly of claim 1, further including a multi-axis stage configured to move the work piece in multiple translational directions or in multiple rotational directions with respect to the tool.

5. The cutting tool assembly of claim 4, wherein the multi-axis stage comprises a five-axis stage providing for movement of the work piece in three translational directions and two rotational directions with respect to the tool.

6. The cutting tool assembly of claim 1, wherein the microstructured features have sides that are substantially perpendicular with a top surface of the work piece.

7. The cutting tool assembly of claim 1, wherein the tool has one thousand or more microstructured features.

8. The cutting tool assembly of claim 1, wherein the work piece has length and width dimensions between five millimeters by five millimeters and two meters by two meters.

9. A method for cutting a work piece, comprising:
   providing an electrical discharge machining (EDM) unit configured for plunge EDM operation;
   operably coupling to the EDM unit a tool having patterned non-adjacent machined microstructured features with complex surfaces; and
   positioning a work piece having a complex surface configured to be inverse to the surface of the tool adjacent the surface of the tool with the microstructured features, the work piece being configured to be machined by the tool in the plunge EDM operation to simultaneously form multiple patterned non-adjacent microstructured features with complex surfaces on the work piece.

10. The method of claim 9, further comprising making a microreplicated pattern in the work piece.

11. The method of claim 9, further comprising making the microstructured features in the work piece being composed of one of the following materials: aluminum, nickel, copper, brass, steel, tungsten carbide, graphite or their alloys.

12. The method of claim 9, further comprising moving the work piece in multiple translational directions or in multiple rotational directions with respect to the tool.

13. The method of claim 9, further comprising repeatedly performing the plunge EDM operation of the tool on the work piece in order to make between 1 and 1000 microstructured features on the complex surface of the work piece.

14. A method for cutting a work piece, comprising:
   making a complex tool, comprising machining a material of the tool to make patterned non-adjacent microstructured features with complex surfaces on a surface of the tool;
   providing an electrical discharge machining (EDM) unit configured for plunge EDM operation;
   operably coupling to the EDM unit the complex tool having the surface with the microstructured features; and
   positioning a work piece having a complex surface configured to be inverse to the surface of the complex tool adjacent the surface of the tool with the microstructured features, the work piece being configured to be machined by the tool in the plunge EDM operation, wherein the complex tool is configured to simultaneously form multiple patterned non-adjacent microstructured features with complex surfaces on the work piece.

15. The method of claim 14, further comprising making the microstructured features in the work piece being composed of one of the following materials: aluminum, nickel, copper, brass, steel, tungsten carbide, graphite or their alloys.

16. The method of claim 14, further comprising moving the work piece in multiple translational directions or in multiple rotational directions with respect to the tool.

17. The method of claim 14, further comprising making the microstructured features in the tool being composed of one of the following materials: aluminum, nickel, copper, brass, or steel.

18. The method of claim 14, wherein the making the tool step comprises making the microstructured features in the surface of the tool using one or more of the following techniques: wire EDM, diamond turning machining, flycutting, milling, grinding, photolithography, etching, or casting.

19. The method of claim 14, further comprising making a microreplicated pattern in the work piece.

20. The method of claim 19, further comprising making non-adjacent rows to form the microreplicated pattern, wherein each of the rows has non-adjacent microstructured features, and wherein each of the microstructured features has a three-dimensional substantially rectangular shape.

* * * * *